Dec. 19, 1939.  F. R. RUEPPEL  2,184,151
POWDER PACKING BOX
Filed Sept. 24, 1936
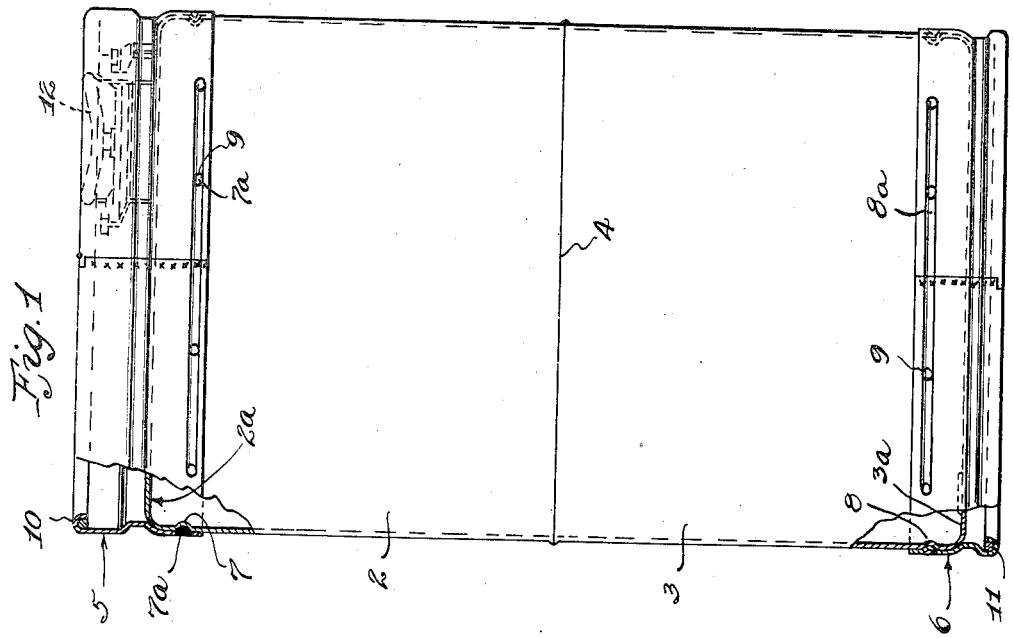
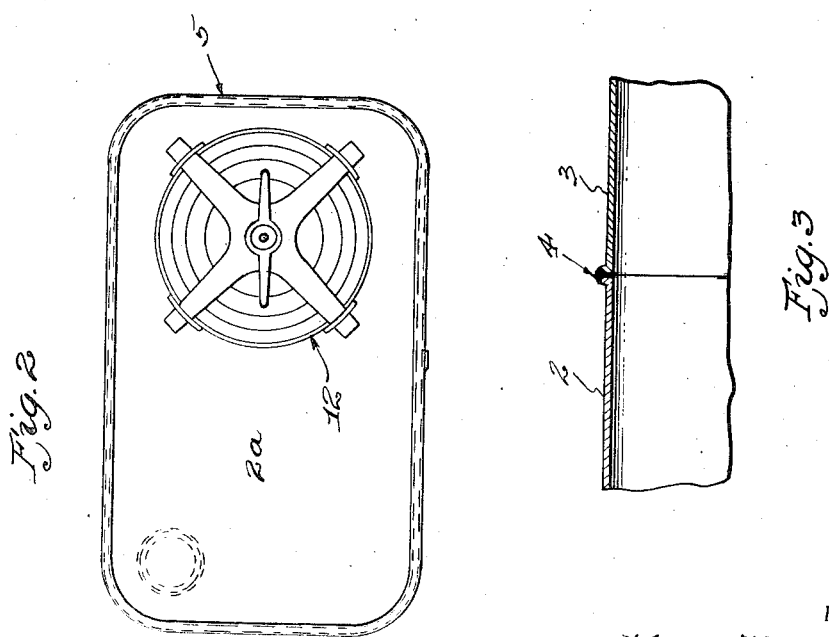
INVENTOR.
Fred R. Rueppel
BY Barnes, Kisselle, Laughlin & Raisch
ATTORNEYS.

Patented Dec. 19, 1939

2,184,151

UNITED STATES PATENT OFFICE 2,184,151

POWDER PACKING BOX

Fred R. Rueppel, East Detroit, Mich.

Application September 24, 1936, Serial No. 102,361

1 Claim. (Cl. 220—66)

This invention relates to a powder packing box and has to do particularly with a container of the type adapted to protect powder against damage from dampness, rough handling and the like.

It is essential that powder packing boxes be absolutely airtight and so reinforced as to stand up against rough handling and shocks and impacts from other causes. Heretofore, it has been the practice to so fabricated powder boxes that the main or body portion of the box is formed of a single sheet of metal bent to shape and requiring one or more longitudinal welding seams and two full circumferential seams at each end.

It is the object of the present invention to provide a powder container which will be relatively light in weight, and economical and simple to manufacture, and which at the same time will be of such construction as to effectively resist rough handling and the like and present much less chance of leaks developing due to shocks being transmitted from the ends of the tank. A further feature of the present invention provides an improved welding arrangement whereby the welding seams are not only located at the best point to resist shocks and strains but also so arranged as to materially reduce the amount of welding required.

The improved container of the present invention contemplates the use of metals of equal thickness thus greatly adding to the final strength of the welded joint. Other features have to do with details of construction and arrangement such as the fabrication of the ends of the box, as will be more clearly brought out in the specification and claim.

In the drawing:

Fig. 1 is an elevation of my novel powder packing box, two ends of which being partly cut away to show the manner of connecting the end bands to the tank body.

Fig. 2 is a plan view of the top of the packing box illustrated in Fig. 1.

Fig. 3 is a fragmentary enlarged view illustrating the preferred manner of welding the deep drawn shells together.

In constructing powder boxes of the present invention embodied in the drawing, one of the main features in obtaining the strengthened construction, resides in the forming of the tank body of two similar deep drawn shells 2 and 3. These shells are preferably arc welded to each other at their open ends as indicated as at 4.

In the preferred embodiment, as shown in Fig. 3, the walls of the two deep drawn shells are of equal thickness and the ends thereof arc welded together. As far as the tank proper is concerned, this is the only welded seam which hermetically seals the tank. In an actual full-size powder box, the length of this seam is forty-nine (49) inches, whereas in standard type powder boxes with the two full end seams and the center seam there are at least 123 inches of arc weld seams. Furthermore, the arc weld seam of the present case being positioned at the center, there is far less chance of leaks developing due to shocks being transmitted from the ends of the tank; in other words, practically all the impacts and shocks from rough handling and the like will be absorbed by the ends of the tank which are integrally formed.

The integrally formed ends $2a$ and $3a$ of the two deep drawn shells 2 and 3 are reinforced by top and bottom bands, generally designated 5 and 6, formed from flat stock. The tank body of the powder box is preferably longitudinal and at each of the ends of the deep drawn shells 2 and 3 and on each of the four sides, are formed embossed portions 7 and 8. Similarly embossed portions $7a$ and $8a$ are formed at spaced intervals on the end bands 5 and 6. The end bands 5 and 6 are preferably assembled to the ends $2a$ and $3a$ of the tank proper under pressure whereby the embossed portions 7 and $7a$ at one end and 8 and $8a$ at the other end register, and to secure a tight fit between the bands and the walls of the deep drawn shells before permanent attachment of the bands by welding.

Holes 9 are formed in each of the embossed portions $7a$ and $8a$ extending around the four sides of the bands and the bands are welded to the main tank at such holes, as is best illustrated in the cut away portion at the top of Fig. 1, the welding metal filling up the holes. The overlapping ends of the bands 5 and 6 are welded together as shown in Fig. 1.

The outer ends 10 and 11 of the bands 5 and 6 are rolled over and around a wire bead; this provides greater strength and at the same time eliminates rough handling or jagged edges which might cut the hands of the men in handling the powder boxes. It will thus be seen that by my improved powder box construction, I not only eliminate longitudinal seam welding and end arc welding, but have provided a unit which is unusually strong and simple and inexpensive to manufacture. Not only are the ends of the tank proper which are usually subject to the greatest impacts and strains reinforced but the bands which overlap a portion of each end of the tank The bands themselves are unusually strong in design and present a smooth, easily gripped surface for handling. The single weld for connecting the two deep drawn shells together is not only strong because of the uniform thickness of the metal forming the shells but the seam is located at such a point as to reduce to a minimum its liability to leakage.

It will be understood that one end of the tank is provided with the usual filling opening and locking cap generally designated 12, the construction of which does not form a part of the present invention.

What I claim is:

A powder packing box comprising a main tank portion formed of two deep drawn shells rectangular in cross-section, the open ends of such shells being welded together to seal the tank and reinforcing bands of rectangular cross-section secured to the ends of the tank, said bands having a necked in portion adapted to contact the closed ends of said shells, a portion of each band and the end portions of said shells being positioned in overlapping relation, and registering embossed portions formed in opposed walls of said rectangular overlapping portions intermediate the corners and the edge of the bands, one of said embossed portions of the registering embossed portions being apertured, and said reinforcing bands and the shells being welded together at said embossed portion and at such apertures.

FRED R. RUEPPEL.